(12) United States Patent
Lindner

(10) Patent No.: US 8,705,515 B2
(45) Date of Patent: Apr. 22, 2014

(54) SYSTEM AND METHOD FOR RESOLVING CONFLICTS IN MULTIPLE SIMULTANEOUS COMMUNICATIONS IN A WIRELESS SYSTEM

(75) Inventor: Mark A. Lindner, Laguna Niguel, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2386 days.

(21) Appl. No.: 11/173,659

(22) Filed: Jun. 30, 2005

(65) Prior Publication Data

US 2007/0002836 A1    Jan. 4, 2007

(51) Int. Cl.
*H04L 12/66* (2006.01)

(52) U.S. Cl.
USPC ............ 370/352; 370/434; 379/201.01

(58) Field of Classification Search
USPC ............ 370/352, 493, 528; 379/201.01
See application file for complete search history.

(56) References Cited

U.S. PATENT DOCUMENTS

| | | | | |
|---|---|---|---|---|
| 4,516,239 | A * | 5/1985 | Maxemchuk | 370/445 |
| 5,737,311 | A * | 4/1998 | Wyld | 370/227 |
| 5,815,553 | A * | 9/1998 | Baugh et al. | 379/88.17 |
| 6,408,342 | B1 | 6/2002 | Moore et al. | |
| 6,771,644 | B1 * | 8/2004 | Brassil et al. | 370/390 |
| 7,408,948 | B2 | 8/2008 | Lopponen et al. | |
| 7,483,708 | B2 * | 1/2009 | Maggenti | 455/518 |
| 7,558,221 | B2 * | 7/2009 | Nelson et al. | 370/260 |
| 7,792,026 | B2 * | 9/2010 | Wang et al. | 370/230 |
| 2002/0128036 | A1 * | 9/2002 | Yach et al. | 455/552 |
| 2003/0053486 | A1 * | 3/2003 | Okamori | 370/474 |
| 2004/0193709 | A1 * | 9/2004 | Selvaggi et al. | 709/224 |
| 2005/0048958 | A1 * | 3/2005 | Mousseau et al. | 455/415 |
| 2005/0220032 | A1 * | 10/2005 | Hu | 370/244 |
| 2006/0088065 | A1 * | 4/2006 | Khatter | 370/528 |
| 2006/0104279 | A1 * | 5/2006 | Fellman et al. | 370/392 |
| 2006/0182030 | A1 * | 8/2006 | Harris et al. | 370/230 |

FOREIGN PATENT DOCUMENTS

| | | |
|---|---|---|
| CA | 2347063 A1 | 1/2002 |
| EP | 1351414 A2 | 10/2003 |
| EP | 1508992 A2 | 2/2005 |
| JP | 2004282538 | 10/2004 |
| JP | 2004328353 | 11/2004 |
| TW | 571596 B | 1/2004 |
| TW | 578404 B | 3/2004 |

(Continued)

OTHER PUBLICATIONS

Harry Newton, Newton's Telecom Dictionary, Mar. 2007, Flatiron Publishing, 23rd Edition, pp. 688-690.*

(Continued)

*Primary Examiner* — William Deane, Jr.
(74) *Attorney, Agent, or Firm* — Raphael Freiwirth

(57) ABSTRACT

A system and method for resolving conflicts in voice data packets received by a wireless device. Each data packet includes a source identification number, a sequence number, and an end-marker bit. The wireless device reconstructs audio streams based upon the sequence of the data packets received. If a data packet has the same source identification number as the last-received data packet and the sequence number of the data packet differs from the sequence number of the last-received data packet for more than a predefined threshold number, the wireless device ends a current audio stream and starts a new audio stream using the data from the data packet.

22 Claims, 6 Drawing Sheets

(56) References Cited

FOREIGN PATENT DOCUMENTS

| TW | 579630 B | 3/2004 |
|---|---|---|
| TW | I234960 | 6/2005 |
| WO | WO0235769 | 5/2002 |
| WO | WO2004075581 A1 | 9/2004 |

OTHER PUBLICATIONS

Harry Newton, Newton'S Telecom Dictionary, 2004, CMP Books, 20th edition, pp. 610-612.*

Audio-Video Transport Working Group H. Schulzrinne AT&T Bell Laboratories: "Issues in Designing a Transport Protocol for Audio and Video Conferences and other Multliparticipant Real-Time Applications" Internet Article, [Online] Oct. 20, 1993 (1193-10-20), pp. 1-57, XP002404215 IETF Working Draft draft-ietf-avt-isses-01.txt Retrieved from the internet: URL:ftp://gaia.cs.umass.edu/pub/hgschulz/rtp/draft-ietf-avt-issues-01.ps> [retrieved on Oct. 24, 2006] sections 3.6, 3.6.1, 3.6.2, 3.6.3, 3.6.5, 3.8, 3.8.1.
International Search Report and Written Opinion—PCT/US2006/026208, International Search Authority—European Patent Office—Nov. 8, 2006.

* cited by examiner

SYSTEM AND METHOD FOR RESOLVING CONFLICTS IN MULTIPLE SIMULTANEOUS COMMUNICATIONS IN A WIRELESS SYSTEM

BACKGROUND OF THE INVENTION

1. Field of the Invention

The present invention generally relates to wireless telecommunications, and more specifically, relates to a system and method for resolving media stream conflicts in communications among multiple communicating devices on a wireless network.

2. Description of the Related Art

Technology advancement has made mobile telephones or wireless communications devices inexpensive, and accordingly, ubiquitous. As wireless telecommunication devices are manufactured with greater processing ability and storage, they also become more versatile and incorporate many features including direct radio communication capability between two or a group of individual handsets. This direct radio communication capability is commonly known as the push-to-talk (PTT) or "walkie-talkie" feature that allows a user with one handset to communicate with the device of a predefined set of members of a group without dialing a destination telephone number.

In one version of a PTT system, a wireless telecommunication device, such as a handset, uses one single frequency for both upward and downward communications with a remote server, while in a normal wireless communication a wireless telephone uses two frequencies for communicating with the server, one for outgoing and one for incoming communications. The PTT system requires the person who is speaking to press a button while talking and then release it when done. Any listener in the group can then press their button to respond. In this manner, the system determines which direction the signal travels. In a typical configuration, when a user makes a call to a receiving party or a group of receiving parties using the PTT system, the user's handset first makes a request to a remote server. The remote server verifies that no other party is using the communication channel and the channel is available then assigns the channel to the user. The user's message is received by the server and the server sends the message for each and every receiving party. After the message is transmitted to every receiving party, the channel is released and ready for use by other parties.

The message is digitized (packetized) and sent as data through a series of sequential data packets according to a predefined protocol. The data packets are received at the user's communication device, where the data are retrieved, and assembled back into an audio stream. The reconstructed audio stream is then played to the user.

However, because of the data packets are transmitted over the air, the transmission and reception may not be very reliable. Sometime, the data packets are lost because of interference or weakness of signals. When one or two data packets are lost during the transmission, the loss may affect the quality of the reconstructed audio stream minimally, and is generally unnoticeable by the listener. On the other hand, if a larger number of data packets are lost during the transmission, it becomes difficult for the user device to reconstruct the audio stream and the quality of the reconstructed audio stream suffers.

In a related situation, when the lost data packets are from two distinct audio streams, it becomes almost impossible for the user device to reconstruct the audio streams. The user device often is not capable of deciding whether a received data packet belongs to a previous audio stream or to a new audio stream. When the user device constructs the audio stream and attaches a data packet of a new audio stream to an existing audio stream, it can result in part of the existing audio stream being overwritten or insertion of an artificial gap between the two spurts ("talking").

Therefore, it is desirous to have an apparatus and method that enables a wireless device to reconstruct audio streams which may have one or more packets dropped, and it is to such an apparatus and method the present invention is primarily directed.

SUMMARY OF THE INVENTION

The apparatus and method of the invention resolve conflicts in data packets of audio streams received by a wireless device. Each data packet includes a source identification number, a sequence number, and an end-marker bit. The wireless device reconstructs audio streams based on the data packets received. If a data packet has the same source identification number as the last-received data packet and the sequence number of the data packet differs from the sequence number of the last-received data packet for more than a predefined threshold number, the wireless device starts a standby audio stream using the data from the data packet. If, after a grace period, no additional data packet for the current audio stream is received, the current audio stream is ended and played to the user. The standby audio stream then becomes the current stream.

In one embodiment, the invention is a method for resolving conflicts in incoming media data packets in push-to-talk (PTT) communications on a wireless telecommunication network, wherein the content of each data packet is added to a media stream that is played on a wireless communication device. The method includes receiving across the wireless telecommunication network at the wireless communication device a data packet, wherein the data packet being part of a PTT communication and having a source identification number, a sequence number, and an end-marker bit, comparing at the wireless communication device the source identification number with a last-source identification number indicating the originator of a current media stream being received at the wireless telecommunication device, and comparing the sequence number with a last-received sequence number. If the incoming source identification number is the same as the last-source identification number and the sequence number is within a predefined threshold from the last-received sequence number, the method further includes adding the incoming data packet to the current media stream. If the incoming source identification number is the same as the last-source identification number and the sequence number is larger than the predefined threshold from the last-received sequence number, the method includes starting a new media stream using the incoming data packet. Finally, if the end-marker bit is set, the method includes ending the current media stream.

In another embodiment, the invention is an apparatus for receiving and sorting data packets in push-to-talk (PTT) communications on a wireless telecommunication network. The apparatus includes a transceiver, a user interface unit, and a controller. The transceiver receives data packets from a remote server, wherein the data packets being part of a PTT communication and each data packet having a source identification number, a sequence number, and an end-marker bit. The user interface unit plays the PTT communication received from the remote server. The controller sorts the data packets and compiling media streams and storing a last-source identification number and a last-received sequence number for a current media stream being played on the user interface and checks the source identification number and the sequence number of each incoming packet. If the source identification number is different from the last-source identification number, the controller starts a media data stream using the incoming data packet and assigns the source identification number to the last-source identification number; if the source identification number is the same as the last-source identification number and the sequence number is within a predefined threshold from the last-received sequence number, the controller adds the incoming data packet to the current media data stream played on the user interface. If the source identification number is the same as the last-source identification number and the sequence number is larger a predefined threshold from the last-received sequence number, the controller starts a new media stream being played at the user interface using the incoming data packet. Finally, if the end-marker bit is set, the controller ends the current media stream.

The present apparatus and methods are therefore advantageous as they enable a wireless communication device to properly reconstruct audio streams based on the data packets received from the remote server during multi-party PTT communications. Such talking spurt identification can also be used in conjunction with other features of the wireless communication device that use data related to the incoming voice data stream.

Other advantages and features of the present invention will become apparent after review of the hereinafter set forth Brief Description of the Drawings, Detailed Description of the Invention, and the Claims.

DETAILED DESCRIPTION OF THE INVENTION

In this description, the terms "communication device," "wireless device," "wireless communications device," "PTT communication device," "handheld device," and "handset" are used interchangeably, and the terms "channels" and "groups" are used interchangeably. The term "application" as used herein is intended to encompass executable and nonexecutable software files, raw data, aggregated data, patches, and other code segments. The term "exemplary" as used herein is intended to only show an example, and does not indicate a preferred embodiment or otherwise indicate a preference for the embodiment shown. Further, like numerals refer to like elements throughout the several views, and the articles "a" and "the" includes plural references, unless otherwise specified in the description.

Figure 1:
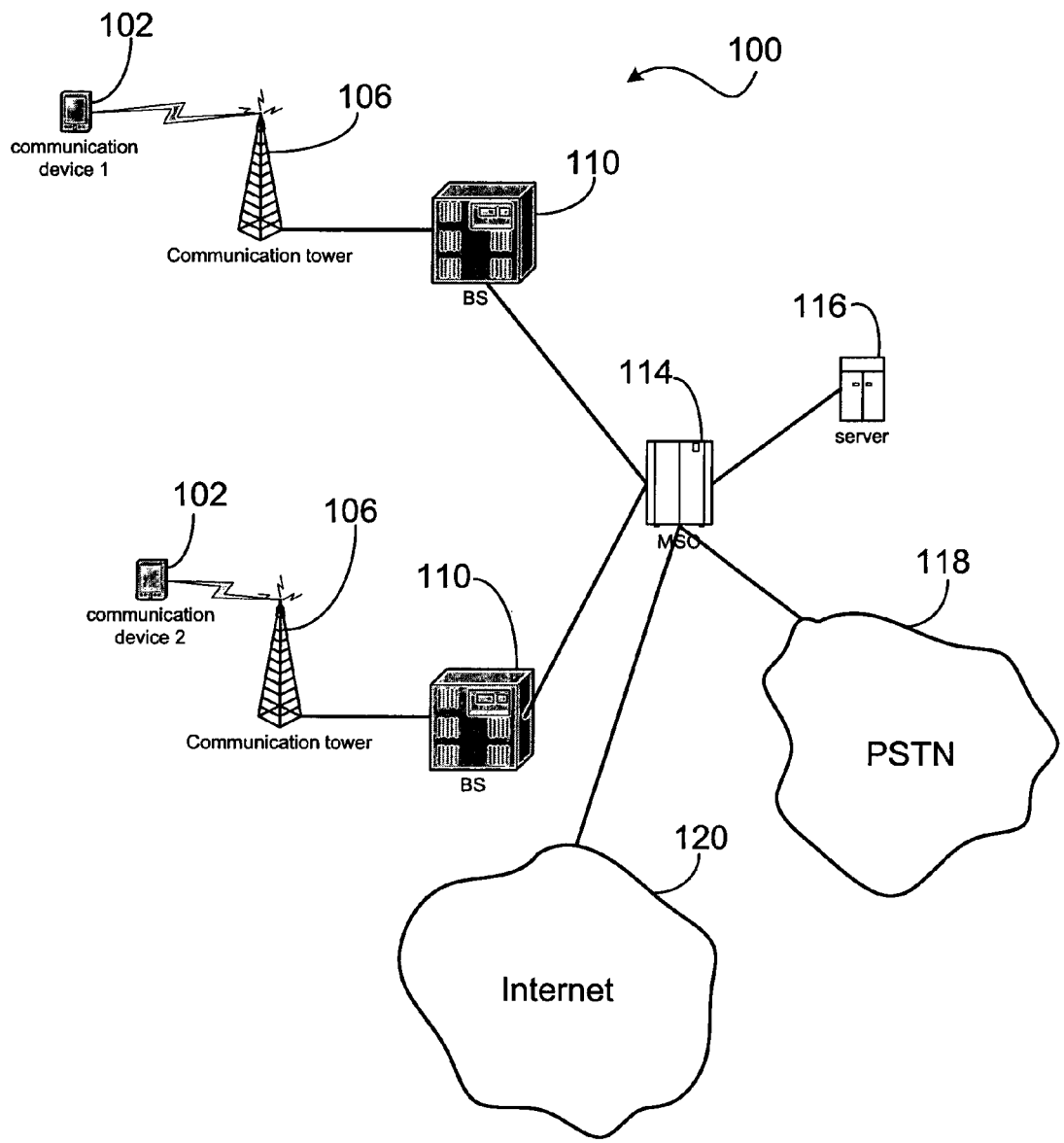
FIG. 1 depicts an exemplary embodiment of a communication network 100 used according to the present system.

In overview, the system and method enables a wireless device to resolve conflicts when constructing an audio stream using received data packets. Each data packet has a header that includes information such as source identification information, sequence number and end-marker bit. The wireless device uses this information to decide whether a received data packet is part of an existing audio stream or part of a new audio stream. FIG. 1 depicts a communication network 100 used where such wireless device may be used according to the present invention. The communication network 100 includes one or more communication towers 106, each connected to a base station (BS) 110 and serving users with communication device 102. The communication device 102 can be cellular telephones, pagers, personal digital assistants (PDAs), laptop computers, or other hand-held, stationary, or portable communication devices that support push-to-talk (PTT) communications. The commands and data input by each user are transmitted as digital data to a communication tower 106. The communication between a user using a communication device 102 and the communication tower 106 can be based on different technologies, such code division multiplex access (CDMA), time division multiplex access (TDMA), frequency division multiplex access (FDMA), the global system for mobile communications (GSM), or other protocols that may be used in a wireless communications network or a data communications network.

The PTT communications are transmitted through data packets over the communication network 100. The wireless communication device 102 sends and receives audio data packets on an assigned communication channel and control data are sent and received through a data channel. The data packets from each device is sent from the communication tower 106 to a base station (BS) 110, and forwarded to a mobile switching center (MSC) 114, which may be connected to a public switched telephone network (PSTN) 118 and the Internet 120. The MSC 114 may be connected to a server 116 that supports the PTT feature in the communications network 100. Optionally, the server 116 may be part of the MSC 114. The server 116 may also suppress transmission of PTT communication to a particular wireless device upon request from that device. The data packets are forwarded by the server 116 to the receiving wireless device 102 where an audio stream will be constructed based on the data in the data packets. In an alternative embodiment (not shown), the MSC 114 may not be needed in a data-only network. The data packets are sent by the BS 110 to a packet data serving node and/or other servers for processing. The data packets are transmitted between the wireless device 102 and the BS 106 according to a predefined protocol such as Real-time Transport Protocol (RTP), TCP/IP, or other suitable protocols.

Figure 2:
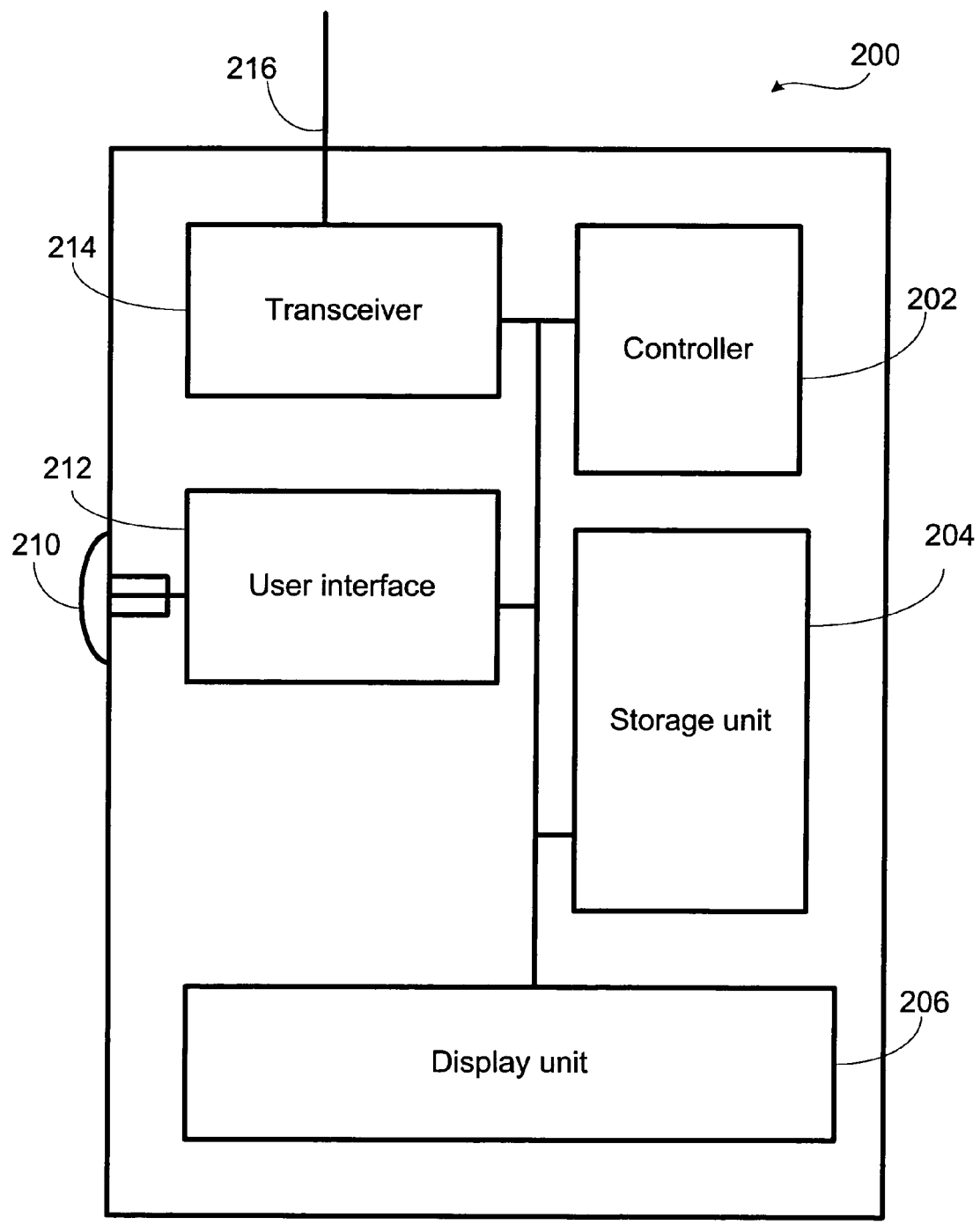
FIG. 2 illustrates a block diagram of a wireless handset.

FIG. 2 illustrates a block diagram 200 of a wireless handset 102. The wireless handset 102 includes a controller 202, a storage unit 204, a display unit 206, a user interface unit 212, a push-to-talk activation unit 210, a transceiver 214, and an antenna 216. The controller 202 can be hardware, software, or a combination thereof. The controller 202 is capable of digitizing audio messages into data packets and sending them to the server 116. The controller 202 is also capable of receiving the data packets from the server 116 and converting them into audio streams. The display unit 206 may display graphical images or information about an incoming PTT communication to the user. The user interface unit 212 controls hardware, such as speaker, microphone, display unit 206, keypad and push-to-talk activation unit 210 used for communication with the user. The transceiver 214 transmits and receives radio signals to and from the communication tower 106, where the radio signals include commands and the data packets. The controller 202 interprets commands and data received from the user and the communication network 100. The storage unit 204 stores information about the PTT communications.

Figure 3:
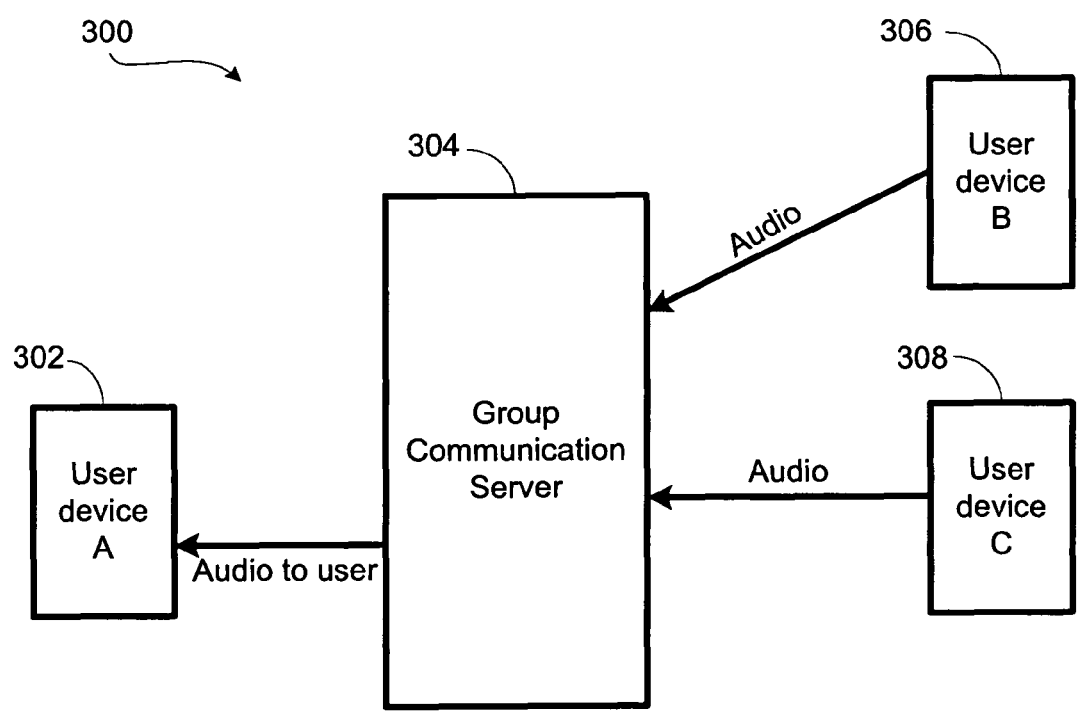
FIG. 3 is a block diagram representing interactions between the server and wireless devices during a PTT communication process.

FIG. 3 is a diagram 300 representing interactions between the server (also known as group communication server) 304 and wireless devices 302 during a PTT communication process. A communication does not occur between an initiating wireless device 302 and a server 304 until a user activates a PTT button. The wireless device 302 may be monitoring a PTT communication and not actively participating in it, i.e., the wireless device 302 listens to PTT communications initiated by other wireless devices and does not broadcast any PTT communication of itself. Generally, the user may start a PTT communication with members of a selected PTT group. The wireless device 302 sends the selected PTT group information and a PTT communication channel request to the server 304. Upon receiving the PTT communication channel request and the selected PTT group information, the server 304 checks the availability of the PTT communication channel assigned to the selected PTT group, and grants the PTT communication channel to the initiating user device 302 if the PTT communication channel is available. After the PTT communication channel is granted to the initiating wireless device 302, the initiating wireless device 302 can transmit audio communication to the selected PTT group 314 through the server 304. Upon receiving the user audio communication, the server 304 identifies the members 306-308 of the PTT communication group that the initiating user device 302 wants to send the audio communication. The server 304 then forwards the audio communication to each member 306-308 of the PTT communication group. It should be noted that data other than audio communication can also be sent in a PTT communication, such as video and/or multimedia data.

Figure 4:
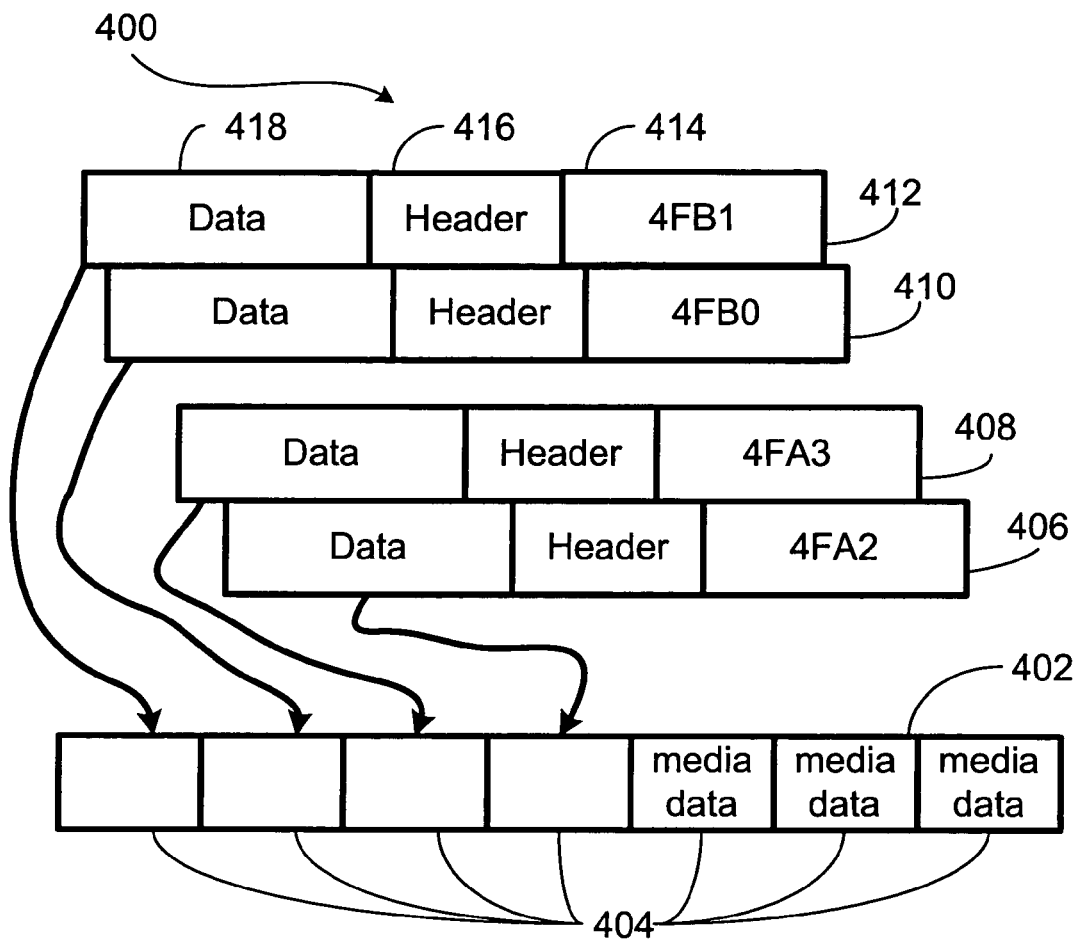
FIG. 4 is a schematic illustrating reconstruction of an audio data stream.

FIG. 4 is an illustration 400 of reconstruction of an audio stream at a wireless device 102. During a m communication various data packets, 406-412, are received from the server 116 by the wireless device 102. In a simplified view, each data packet includes a header portion and a data portion. The header portion includes a sequence number 414 and other header information 416 such as source identification, time stamp, end-marker, etc. The data portion 418 of each data packet includes digitized audio data. The data 404 from each data packet is concatenated sequentially to an audio data stream 402. If two consecutive data packets received by the wireless device 102 have sequence number that are not consecutives as shown by data packets 408 and 410, the controller 202 needs to decide whether they are part of the same PTT communication. If these data packets have different source identification numbers, the controller 202 can easily place them in two different audio streams, ending a first audio stream and starting a new audio stream. If these data packets have the same source identification numbers, they may be from the same audio and belong to the same audio data stream, but they may also be from different audios and belong to different audio data streams.

When converting an audio to an audio data stream, wherein the audio data stream is sent through a plurality of data packets over a network to a receiving device, each data packet is assigned a sequence number. Generally a number is assigned as the sequence number when a new audio data stream is started. As a way to help the reconstruction of the audio data stream at the receiving device, a random number is generally used to start a new sequence number. To further ensure the distinction of one talk spurt from another, the new sequence number is set at least a certain value away from the last used sequence number. One preferred separation value used is 1000. This separation value can be used to determine whether two data packets belong to the same audio data stream. If the difference between the sequence numbers is greater than the separation value, the chances are the data packets belong to different audio data stream. If the difference is lesser than the separation value, the data packets are probably from the same audio data stream.

For the example in FIG. 4, the separation value is set to 1000 hex, and the sequence numbers of the two data packets 408 and 410 in FIG. 4 differ less than the separation value, therefore, the controller 202 will conclude that these data packets, though not consecutive, are part of the same audio data stream. The data from the data packet 410 and its subsequent data packets are concatenated to the current audio data stream 402. The controller 202 continues to process the incoming data packets and concatenating them to the current audio data stream 402 until an end-marker bit is set in the data packet. After the end-marker bit is set, the audio data stream 402 is closed and played to the user.

Figure 5:
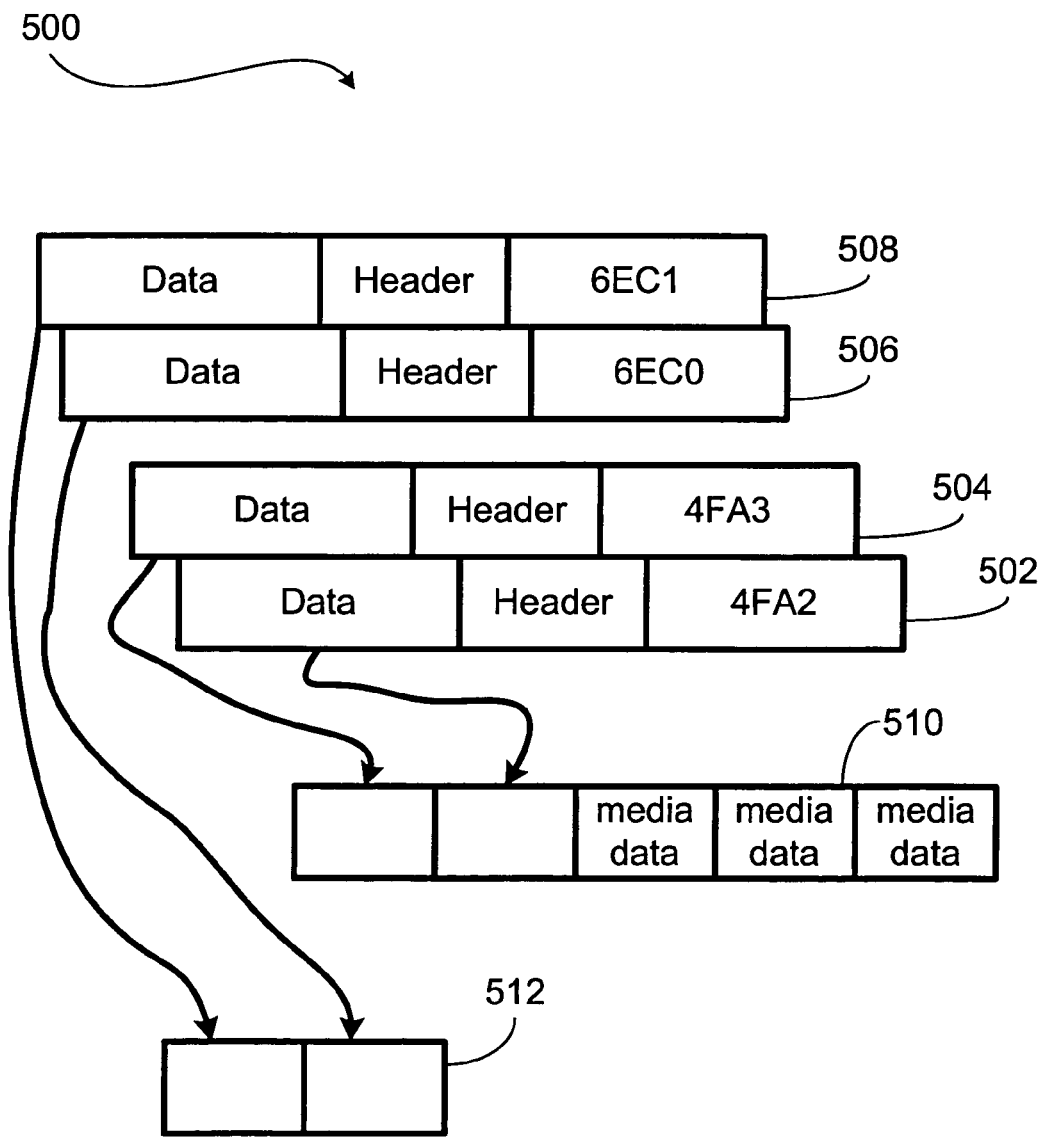
FIG. 5 is a schematic illustrating reconstruction of an audio data stream when a few data packets are lost.

FIG. 5 is another illustration 500 of a reconstruction of an audio stream at a wireless device 102. The various data packets, 502-508, received by the wireless device 102 have the same source identification numbers (not shown) that is the same as the current audio data stream 510. The controller 202 checks the sequence number 414 of each data packet and compares it with the sequence number of the last-received data packet. If the difference between the sequence number of the data packet and the last-received data packet is lesser than a predefined separation value, the data 418 is processed and concatenated to the current audio data stream 510 and the sequence number of the data packet is saved as the last-received sequence number and used to the next comparison. The sequence number for the data packets 502-504 are within the predefined separation value from the sequence number of the last-received data packet, therefore, the data from these data packets 502-504 are concatenated to the current audio data stream 510.

However, when checking the sequence number 418 of the data packet 506, the controller 202 compares the sequence number 6EC0 to the sequence number of the last-received data packet, which is 4FA3, and verifies that the difference is larger than the predefined separation value 1000. Although, the data packet 504 and 506 have the same source identification number (not shown), the controller 202 realizes that they belong to different audio streams. Since it is possible that the data packets have been re-ordered during the transmission, and the later packets have arrived out of order and before the early packets. If the data packet 506 is the first out of order data packet, the controller 202 buffers the data from the data packet 506 into a standby audio stream and starts a grace period timer. The controller 202 will wait for a grace period for additional data packets that may be arriving late and out of order. If no additional data packets are received when the grace period expires, the controller proceeds to end the current audio data stream, plays it to the user, and makes the standby audio stream the current audio stream.

If the data packet 506 is not the first out of order data packet received, the controller 202 adds the data to an existing standby audio stream 512 if the sequence number is not larger than the predefined separation value from the last out of order data packet received. Additional standby audio streams may be needed if the sequence number of the data packet 506 differs more than the predefined separation value from the last out of order data packet.

Figure 6:
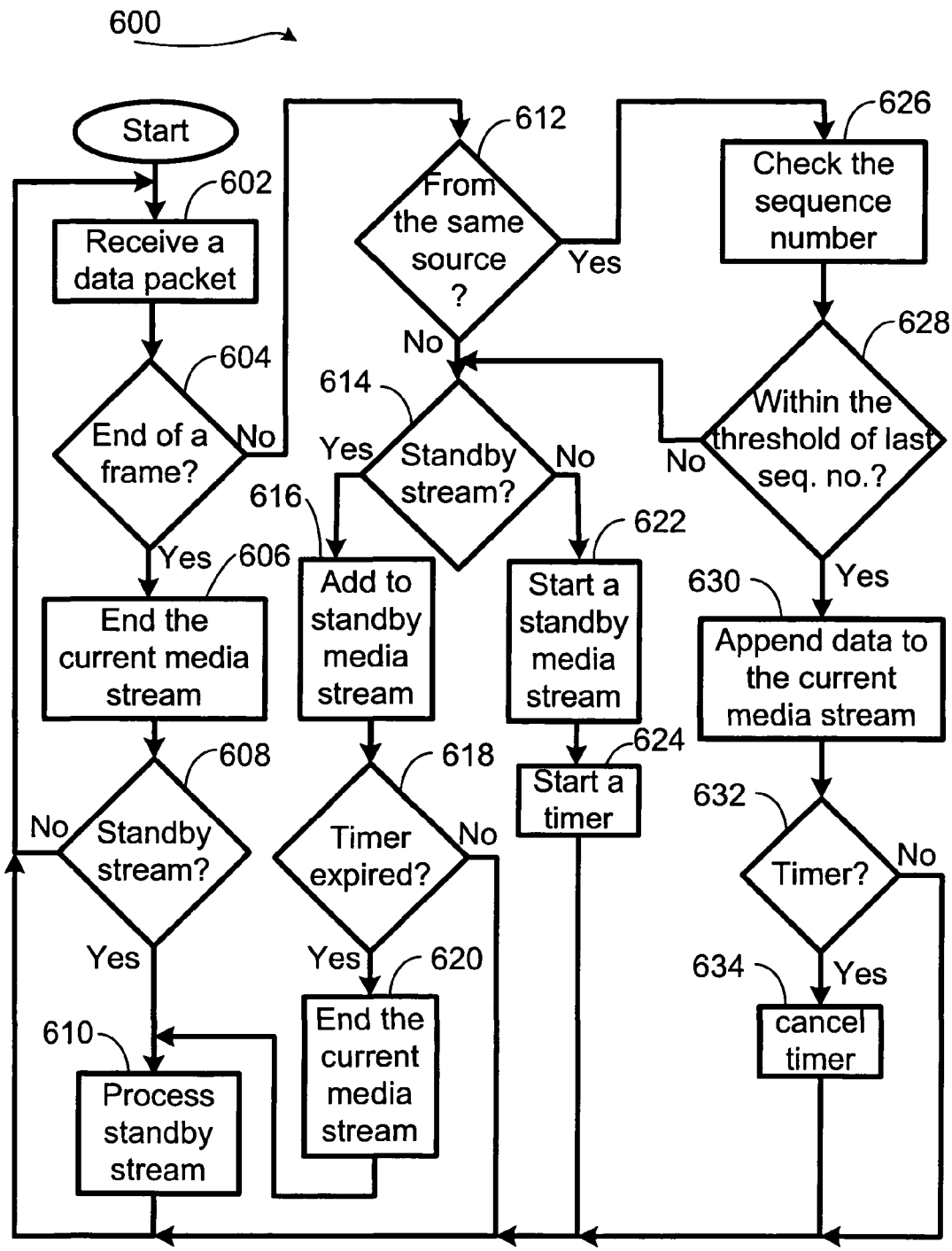
FIG. 6 is a flow chart for an exemplary embodiment of audio data stream reconstruction process.

FIG. 6 is a flow chart 600 for an audio data stream reconstruction process. The wireless device 102 receives a data packet from the server 116, step 602, and checks whether an end of frame, indicated by an end-marker bit, is received, step 604. If an end-marker bit is set, the current audio data stream is ended and played to the user, step 606. The controller 202 checks whether there is a standby audio stream, step 608. If there is a standby audio stream, the controller 202 makes it the current audio stream, step 610.

If the data does not have the end-marker bit set, the controller 202 checks the source of the data packet against the source of the last-received (last-source) data packet, step 612. If the data packet from a different source, the controller 202 interprets it as an out-of-order data packet. The controller checks whether there is a standby audio stream set for this source, step 614. If no such standby audio stream has been set up, the controller 202 start a new standby audio stream, step 622, and starts a grace period timer, step 624. If a standby audio stream has already been set up for the data packets from this source, then the data is added to this standby audio stream, step 616. The controller 202 also checks whether the grace period timer has expired, step 618. If the grace period timer has expired, the controller ends the current audio stream and plays it to the user, step 620, and makes the standby audio stream the current audio stream, step 610.

If the data packet is from the same source as the previous data packet, the controller 202 checks the sequence number of the data packet, step 626. As shown by step 628, if the difference between the sequence number and the sequence number of the last-received data packet is lesser than a predefined separation value, i.e., the sequence number is within the threshold of the last sequence number. then the controller 202 appends the data to the current audio data stream, step 630, and checks whether there is any grace period time set, step 632.

It is possible that some data packets have been received out of order and placed into a standby audio stream and a grace period timer started. After the grace period timer has started, additional data packets are received for the current audio stream. In this situation, the controller 202 continues to process the data and adding them to the current audio stream. Therefore, as shown by step 634, if the grace period timer is set, the controller 202 cancels it and continues to receive another data packet. If the sequence number is not within the threshold of the predefined separation value from the last-received data packet, the controller 202 interprets it as from an out-of-sequence data packet for a new audio stream and checks whether there is a standby dream set up for this new audio stream, step 614. The process continues as illustrated in FIG. 6 and described above.

The following is a description of one use scenario illustrating resolution of multiple simultaneous communications in a PTT communication. John is using the PTT communication feature of his wireless device to communicate with Bob and Peter. John activates the PTT feature and talks on his wireless device. He interrupts briefly before continuing his talk. His communication is transmitted through a plurality of data packets to a server and then distributed by the server to Bob and Peter. Bob's wireless device receives the data packets and constructs an audio data stream. Because of interference, a few of the data packets are lost during the transmission. The wireless device checks for the source and sequence number continuously. When it sees that there is a gap in the sequence number, it checks the size of the gap against the predefined separation number. When it sees that the gap is smaller than the separation number, it knows that a few data packets were lost, and attaches the data from the data packet to the current audio data stream and continues to process other incoming stream. When the wireless device receives an end-marker bit that is set because John has interrupted his talk, the wireless device ends the current audio data stream and plays it to Bob. When it receives new data packets, it starts to construct a new audio data stream.

In another scenario, Peter starts to respond as soon as John ends his talk and the last few data packets from John's talk are lost during the transmission. Both John and Peter's messages are transmitted as data packets to Bob's wireless device. The wireless device receives John's data packets and assembles the audio data stream. Then, wireless device realizes that the source identification number has changed in the current received data packet. The wireless device buffers the data packets from Peter in a standby audio stream because it cannot be sure that John has ended his talk. It is possible that the data packets from Peter and John have been re-ordered during the transmission by the server. The wireless device starts a grace period timer. If at the end of the grace period, no more data packets are received from John, the wireless device ends the current audio data stream from John and plays it to Bob. After ending the audio data stream for John's talk, the wireless device moves the standby audio data stream for Peter's talk to the current audio data stream. Because of methods described above, the wireless device will not attach the data of Peter's talk to John's talk and will not concatenated two distinct talking spurts from John playing them as a single spurt.

In view of the method being executable on a wireless service provider's computer device or a wireless communications device, the method can be performed by a program resident in a computer readable medium, where the program directs a server or other computer device having a computer platform to perform the steps of the method. The computer readable medium can be the memory of the server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In the context of FIG. 6, the method may be implemented, for example, by operating portion(s) of the wireless network, such as a wireless communications device or the server, to execute a sequence of machine-readable instructions. Though the steps are illustrated in sequence, the method may be implemented in difference sequence or as an event driven process. The instructions can reside in various types of signal-bearing or data storage primary, secondary, or tertiary media. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the invention has been particularly shown and described with reference to a preferred embodiment thereof, it will be understood by those skilled in the art that various changes in form and detail may be made without departing from the spirit and scope of the present invention as set forth in the following claims. For example, the description above is based on an audio PTT communication, it is understood the apparatus, system, and method can be easily modified to support other type of media, such as video, data, etc. Furthermore, although elements of the invention may be described or claimed in the singular, the plural is contemplated unless limitation to the singular is explicitly stated.

What is claimed is:

1. A computer implemented method for resolving conflicts in incoming media data packets in push-to-talk (PTT) communications on a wireless telecommunication network, wherein the content of each data packet is added to a media stream that is played on a wireless communication device, comprising the steps of:
receiving across the wireless telecommunication network at the wireless communication device a data packet, the data packet being part of a PTT communication and having a source identification number, a sequence number, and an end-marker bit;
comparing at the wireless communication device the source identification number with a last-source identification number indicating the originator of a current media stream being received at the wireless telecommunication device;
comparing the sequence number with a last-received sequence number;
when determining that the incoming source identification number is the same as the last-source identification number and the sequence number is within a predefined threshold from the last-received sequence number, adding the incoming data packet to the current media stream; and
when determining that the incoming source identification number is the same as the last-source identification number and the sequence number is larger than the predefined threshold from the last-received sequence number, starting a new media stream using the incoming data packet.

2. The method of claim 1, further comprising the step of playing the current media stream on the wireless device to a user.

3. The method of claim 1, further comprising the step of, if the incoming source identification number is different from the last-source identification number, starting a new media stream using the incoming data packet and assigning the source identification number to the last-source identification number.

4. The method of claim 1, wherein the media stream is an audio stream.

5. The method of claim 1, wherein the media stream is a video stream.

6. An apparatus for receiving and sorting data packets in push-to-talk (PTT) communications on a wireless telecommunication network, comprising:
a transceiver for receiving data packets from a remote server, the data packets being part of a PTT communication and each data packet having a source identification number, a sequence number, and an end-marker bit;
a user interface unit for playing the PTT communication received from the remote server; and
a controller for sorting the data packets and compiling media streams and storing a last- source identification number and a last-received sequence number for a current media stream being played on the user interface,
wherein the controller checks the source identification number and the sequence number of each incoming packet,
when determining that the source identification number is different from the last-source identification number, starting a media data stream using the incoming data packet and assigning the source identification number to the last-source identification number,
when determining that the source identification number is the same as the last-source identification number and the sequence number is within a predefined threshold from the last-received sequence number, adding the incoming data packet to the current media data stream played on the user interface,
when determining that the source identification number is the same as the last-source identification number and the sequence number is larger a predefined threshold from the last-received sequence number, starting a new media stream being played at the user interface using the incoming data packet, and
when determining that the end-marker bit is set, ending the current media stream.

7. The apparatus of claim 6, further comprising a display unit for displaying activity announcements regarding PTT communications.

8. The apparatus of claim 6, further comprising a storage unit for storing the last-source identification number and the last-received sequence number.

9. The apparatus of claim 6, wherein the media stream is an audio stream.

10. The apparatus of claim 6, wherein the media stream is a video stream.

11. An apparatus for receiving and sorting data packets in push-to-talk (PTT) communications on a wireless telecommunication network, comprising:
means for transmitting and receiving data packets from a remote server, the data packets being part of a PTT communication and each data packet having a source identification number, a sequence number, and an end-marker bit;
user interfacing means for playing the PTT communication received from the remote server; and
controlling means for sorting the data packets and compiling media streams and storing a last-source identification number and a last-received sequence number for a current media stream being played on the user interface,
wherein the controlling means checks the source identification number and the sequence number of each incoming packet,
when determining that the source identification number is different from the last-source identification number, starting a media data stream using the incoming data packet and assigning the source identification number to the last-source identification number,
when determining that the source identification number is the same as the last-source identification number and the sequence number is within a predefined threshold from the last-received sequence number, adding the incoming data packet to the current media data stream played on the user interface,
when determining that the source identification number is the same as the last-source identification number and the sequence number is larger a predefined threshold from the last-received sequence number, starting a new media stream being played at the user interfacing means using the incoming data packet, and
when determining that the end-marker bit is set, ending the current media stream.

12. The apparatus of claim 11, further comprising means for displaying activity announcements regarding PTT communications.

13. The apparatus of claim 11, further comprising means for storing the last-source identification number and the last-received sequence number.

14. The apparatus of claim 11, wherein the media stream is an audio stream.

15. The apparatus of claim 11, wherein the media stream is a video stream.

16. A non-transitory computer-readable storage medium having stored thereon processor executable software instructions configured to cause a processor to perform operations for resolving conflicts in incoming media data packets in push-to-talk (PTT) communications on a wireless telecommunication network, wherein the content of each data packet is added to a media stream that is played on a wireless communication device, the operations comprising:
- receiving across the wireless telecommunication network at the wireless communication device a data packet, the data packet being part of a PTT communication and having a source identification number, a sequence number, and an end-marker bit;
- comparing at the wireless communication device the source identification number with a last-source identification number indicating the originator of a current media stream being received at the wireless telecommunication device;
- comparing the sequence number with a last-received sequence number;
- when determining that the incoming source identification number is the same as the last-source identification number and the sequence number is within a predefined threshold from the last-received sequence number, adding the incoming data packet to the current media stream;
- when determining that the incoming source identification number is the same as the last-source identification number and the sequence number is larger than the predefined threshold from the last-received sequence number, starting a new media stream using the incoming data packet.

17. The non-transitory computer readable storage medium of claim 16, wherein the stored processor-executable software instructions are configured to cause a processor to perform operations further comprising playing the current media stream on the wireless device to a user.

18. The non-transitory computer readable storage medium of claim 16, wherein the stored processor-executable software instructions are configured to cause a processor to perform operations further comprising, if the incoming source identification number is different from the last-source identification number, starting a new media stream using the incoming data packet and assigning the source identification number to the last-source identification number.

19. The non-transitory computer readable storage medium of claim 16, wherein the media stream is an audio stream.

20. The non-transitory computer readable storage medium of claim 16, wherein the media stream is a video stream.

21. A system for a user device to maintain multiple push-to-talk (PTT) communications with a server in a wireless communications network, comprising:
- a server in communication with the wireless communication network, the server selectively transmitting to a first user device a plurality of data packets received from a second user device, each data packet having a source identification number, a sequence number, an end-marker bit and an audio data;
- a second user device capable of communicating with the server through the wireless communications network, the second user device being capable of generating a set of data packets for an audio stream, wherein the set of data packets start with a random sequence number that differs from the sequence number of a last set of data packet by at least a predefined threshold number; and
- a first user device capable of communicating with the server through the wireless communications network, the first user device being capable of:
  - receiving the plurality of data packets,
  - analyzing each data packet,
  - when determining that the source identification number from a received data packet is different from a last-received data packet, starting a new audio stream using the audio data from the received data packet,
  - when determining that the source identification number from a received data packet is the same as the last-received data packet and the difference between the sequence numbers of the received data packet and the last-received data packet is larger than a predefined threshold number, starting a new audio stream using the audio data from the received data packet, and
  - when determining that the source identification number from a received data packet is the same as the last-received data packet and the difference between the sequence numbers of the received data packet and the last-received data packet is lesser than a predefined threshold number, appending the audio data from the received data packet to a current audio stream.

22. A computer implemented method for resolving conflicts in incoming media data packets in push-to-talk (PTT) communications on a wireless telecommunication network, wherein the content of each data packet is added to a media stream that is played on a wireless communication device, comprising:
- receiving across the wireless telecommunication network at the wireless communication device a data packet, the data packet being part of a PTT communication and having a source identification number, a sequence number, and an end-marker bit;
- comparing at the wireless communication device the source identification number with a last-source identification number indicating the originator of a current media stream being received at the wireless telecommunication device;
- comparing the sequence number with a last-received sequence number;
- when determining that the incoming source identification number is the same as the last-source identification number and the sequence number is within a predefined threshold from the last-received sequence number, adding the incoming data packet to the current media stream; and
- when determining that the incoming source identification number is the same as the last-source identification number and the sequence number is larger than the predefined threshold from the last-received sequence number, a step for starting a new media stream using the incoming data packet.

* * * * *